United States Patent
Abe et al.

(10) Patent No.: US 10,144,792 B2
(45) Date of Patent: Dec. 4, 2018

(54) METHOD FOR PRODUCING ELECTRIC WIRE, METHOD FOR PRODUCING MOLDED ARTILE, AND METHOD FOR PRODUCING RESIN MATERIAL CONTAINING MODIFIED FLUORORESIN

(71) Applicant: ASAHI GLASS COMPANY, LIMITED, Chiyoda-ku (JP)

(72) Inventors: Masatoshi Abe, Chiyoda-Ku (JP); Tomoya Hosoda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 115 days.

(21) Appl. No.: 15/226,356

(22) Filed: Aug. 2, 2016

(65) Prior Publication Data

US 2016/0340455 A1  Nov. 24, 2016

Related U.S. Application Data

(63) Continuation of application No. PCT/JP2015/055447, filed on Feb. 25, 2015.

(30) Foreign Application Priority Data

Feb. 26, 2014 (JP) ................. 2014-035140

(51) Int. Cl.
  *C08F 214/26* (2006.01)
  *H01B 3/44* (2006.01)
  *C08J 7/12* (2006.01)
  *C08J 3/28* (2006.01)

(52) U.S. Cl.
  CPC ...... *C08F 214/262* (2013.01); *C08F 214/265* (2013.01); *C08J 3/28* (2013.01); *C08J 7/123* (2013.01); *H01B 3/445* (2013.01); *C08J 2327/18* (2013.01)

(58) Field of Classification Search
  CPC ............ C08J 2327/18; C08J 2327/20; C08J 2327/22; C08J 3/28; C08J 7/123; H01B 3/445; C08F 214/262
  USPC ........................................................ 522/187
  See application file for complete search history.

(56) References Cited

U.S. PATENT DOCUMENTS

| 5,985,949 | A | 11/1999 | Seguchi et al. | |
| 6,398,542 | B1* | 6/2002 | Romanski | B29C 45/28 425/564 |
| 9,831,014 | B2* | 11/2017 | Imamura | C08J 3/28 |
| 9,963,564 | B2* | 5/2018 | Imamura | C08J 7/123 |
| 2003/0062190 | A1* | 4/2003 | Kim | H01B 3/306 174/149 R |
| 2006/0218785 | A1* | 10/2006 | Horiuchi | H04R 19/016 29/886 |
| 2006/0246371 | A1* | 11/2006 | Nishikawa | G03F 7/0046 430/270.1 |
| 2006/0270774 | A1* | 11/2006 | Yamamoto | C08L 27/18 524/449 |
| 2007/0023690 | A1* | 2/2007 | Tsuchiya | C08J 7/123 250/492.1 |
| 2009/0038821 | A1* | 2/2009 | Sato | C08F 214/262 174/120 R |
| 2010/0034919 | A1* | 2/2010 | Brothers | B32B 1/08 425/461 |
| 2014/0296367 | A1 | 10/2014 | Taguchi et al. | |

FOREIGN PATENT DOCUMENTS

| EP | 2 810 980 A1 | 12/2014 |
| JP | 1-237113 | 9/1989 |
| JP | 7-292199 | 11/1995 |
| JP | 9-278907 | 10/1997 |
| JP | 2008-231331 | 10/2008 |
| JP | 2009-252719 A | 10/2009 |
| WO | WO 2013/114981 A1 | 8/2013 |

OTHER PUBLICATIONS

International Search Report dated Jun. 2, 2015 in PCT/JP2015/055447, filed on Feb. 25, 2015.

* cited by examiner

*Primary Examiner* — Sanza L. McClendon

(74) *Attorney, Agent, or Firm* — Oblon, McClelland, Maier & Neustadt, L.L.P.

(57) ABSTRACT

A method for producing an electric wire or a molded article with improved abrasion resistance is described. The method uses a fluororesin via electron beam irradiation in air at a temperature where the fluororesin does not melt. A method for producing a resin material containing a modified fluororesin is also described.

19 Claims, No Drawings

METHOD FOR PRODUCING ELECTRIC WIRE, METHOD FOR PRODUCING MOLDED ARTILE, AND METHOD FOR PRODUCING RESIN MATERIAL CONTAINING MODIFIED FLUORORESIN

TECHNICAL FIELD

The present invention relates to a method for producing an electric wire, a method for producing a molded article, and a method for producing a resin material containing a modified fluororesin.

BACKGROUND ART

Fluororesins such as polytetrafluoroethylene (hereinafter referred to also as "PTFE"), a tetrafluoroethylene/perfluoro (alkyl vinyl ether) copolymer (hereinafter referred to also as "PFA"), an ethylene/tetrafluoroethylene copolymer (hereinafter referred to also as "ETFE"), polyvinylidene fluoride (hereinafter referred to also as "PVdF", etc. are excellent in heat resistance, flame retardancy, chemical resistance, weather resistance, non-stickiness, low friction property, low dielectric property, etc. and thus have been used in a wide range of fields such as coating materials for heat-resistant flame retardant electric wires, chemical plant corrosion-resistant piping materials, agricultural vinyl house materials, release coat materials for kitchen utensils, etc.

Among such fluorine resins, a perfluoro type fluororesin such as PTFE or PFA is excellent in chemical resistance and heat resistance, as compared with a partially fluorinated type fluororesin such as ETFE or PVdF. But, on the other hand, since its intermolecular force is low, the cohesiveness is small, and its elastic modulus or abrasion resistance tends to be low. A material having a low elastic modulus or abrasion resistance has such a problem that it tends to be easily deformed particularly in an application as a slide member or electric wire covering material to be used under a high load or at a high temperature, or it tends to be easily scraped by abrasion with the other material.

In order to improve the elastic modulus or abrasion resistance of a fluororesin, attempts have been made to crosslink the fluororesin. For example, Patent Document 1 has proposed a method wherein ETFE kneaded with a cross-linking aid is extrusion-molded under a predetermined condition, and the obtained molded product is irradiated with an electron beam and cross-linked.

This method is effective for a partially fluorinated type fluororesin, but when it is applied to a perfluoro type fluororesin, the molecular main chain is cut by electron beam irradiation, and embrittlement is promoted, thus leading to such a problem that physical properties such as mechanical strength, etc. tend to be deteriorated.

Against this problem, attempts have been made to cross-link a perfluoro type fluororesin.

In Patent Document 2, a perfluoro type fluororesin is irradiated with ionizing radiation in the absence of oxygen at a temperature of at least the crystalline melting temperature and cross-linked, in an attempt to improve abrasion resistance, wear resistance, load resistance, etc.

In Patent Document 3, it has been attempted to improve mechanical properties by incorporating a fluorinated divinyl polyether compound as a cross-linking agent to PFA having a heat of crystal fusion of not more than 10 J/g, followed by crosslinking by irradiation with radiation.

However, in the method of Patent Document 2, it is necessary to irradiate the electron beam at a temperature of at least the crystalline melting point of the fluororesin, whereby when an electron beam is irradiated to the molded article, if the melt viscosity of the fluororesin is low, the shape of the molded article cannot be maintained. For this reason, the fluororesin that can actually be used is limited to PTFE having a high melt viscosity. In addition, also in the case of PTFE, there will be such a problem as a dimensional change or compression bonding with other material at the time of melting. On the other hand, if at the stage of pellets before molding, the fluororesin is cross-liked by irradiation of an electron beam, the fluidity decreases and the moldability tends to be deteriorated.

In the method of Patent Document 3, it is said to be possible to conduct crosslinking at a temperature of not higher than 100° C. However, in this method, it is necessary to use a cross-linking agent containing a vinyl group, whereby after the crosslinking, the heat resistance and heat stability tend to be deteriorated by vinyl groups remaining as unreacted. Therefore, the use of a crosslinking agent containing a vinyl group is not preferred for applications such as slide members or electric wire covering materials used at high temperatures. Also in Patent Document 3, irradiation of the electron beam is conducted in the absence of oxygen.

Thus, a technique has not yet been established whereby it is possible to improve the abrasion resistance of a perfluoro type fluororesin, by electron beam irradiation in air at a temperature where the fluororesin does not melt, without combination with a crosslinking agent.

PRIOR ART DOCUMENTS

Patent Documents

Patent Document 1: JP-A-1-237113
Patent Document 2: JP-A-9-278907
Patent Document 3: JP-A-2008-231331

DISCLOSURE OF INVENTION

Technical Problem

It is an object of the present invention to provide a production method capable of improving the abrasion resistance of an electric wire or molded article using a fluororesin, by electron beam irradiation in air at a temperature where the fluororesin does not melt, and a method for producing a resin material containing a modified fluororesin whereby an electric wire or molded article excellent in abrasion resistance is obtainable.

Solution to Problem

The present inventors have conducted intensive studies and have surprisingly found it possible to impart high abrasion resistance by electron beam irradiation in air at temperature where a fluororesin does not melt, by introducing a functional group containing a carbonyl group to a perfluoro type fluororesin and by defining the dose of the electron beam.

The present invention is based on the above finding and has the following gist.

[1] A method for producing an electric wire comprising a conductor and an insulating layer containing a fluororesin and covering the surface of the conductor, which comprises a step of irradiating an electron beam to the insulating layer containing a fluororesin and covering the surface of the conductor, to modify at least part of the fluororesin to a modified fluororesin thereby to form an insulating layer containing the modified fluororesin, characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)) and does not contain a structural unit based on a hydrocarbon monomer (but excluding the structural unit (a)), and irradiation of the electron beam is conducted under conditions of a temperature of less than the crystalline melting point of the fluororesin and in air, to satisfy at least one of the following (1) to (3):

$$0.5 \leq Mb/Ma < 1.2 \tag{1}$$

wherein Ma represents a melt flow rate (g/10 min) of the fluororesin prior to the electron beam irradiation, and Mb represents a melt flow rate (g/10 min) of the fluororesin after the electron beam irradiation, $$1 \leq Tb - Ta < 6.5 \tag{2}$$

wherein Ta represents a crystalline melting point (° C.) of the fluororesin prior to the electron beam irradiation, and Tb is a crystalline melting point (° C.) of the fluororesin after the electron beam irradiation, $$\text{irradiation dose of less than 30 kGy.} \tag{3}$$

[2] The method for producing an electric wire according to [1], wherein the fluororesin is a copolymer comprising a structural unit (a1) based on a hydrocarbon monomer having either one or both of a carboxy group and an acid anhydride group, a structural unit (b1) based on tetrafluoroethylene, and a structural unit (b2) based on a perfluoromonomer (but excluding tetrafluoroethylene), and based on the total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %.

[3] A method for producing a molded article, which comprises a step of irradiating an electron beam to a molded article containing a fluororesin, to modify at least part of the fluororesin to a modified fluororesin, thereby to obtain a molded article containing said modified fluororesin, characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)) and does not contain a structural unit based on a hydrocarbon monomer (but excluding the structural unit (a)), and irradiation of the electron beam is conducted under conditions of a temperature of less than the crystalline melting point of the fluororesin and in air, to satisfy at least one of the following (1) to (3):

$$0.5 \leq Mb/Ma < 1.2 \tag{1}$$

wherein Ma represents a melt flow rate (g/10 min) of the fluororesin prior to the electron beam irradiation, and Mb represents a melt flow rate (g/10 min) of the fluororesin after the electron beam irradiation, $$1 \leq Tb - Ta < 6.5 \tag{2}$$

wherein Ta represents a crystalline melting point (° C.) of the fluororesin prior to the electron beam irradiation, and Tb is a crystalline melting point (° C.) of the fluororesin after the electron beam irradiation, $$\text{irradiation dose of less than 30 kGy.} \tag{3}$$

[4] The method for producing a molded article according to [3], wherein the fluororesin is a copolymer comprising a structural unit (a1) based on a hydrocarbon monomer having either one or both of a carboxy group and an acid anhydride group, a structural unit (b1) based on tetrafluoroethylene, and a structural unit (b2) based on a perfluoromonomer (but excluding tetrafluoroethylene), and based on the total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %. [5] A method for producing a resin material containing a modified fluororesin, which comprises a step of irradiating an electron beam to a resin material containing a fluororesin, to modify at least part of the fluororesin to a modified fluororesin, thereby to obtain a resin material containing said modified fluororesin, characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)) and does not contain a structural unit based on a hydrocarbon monomer (but excluding the structural unit (a)), and irradiation of the electron beam is conducted under conditions of a temperature of less than the crystalline melting point of the fluororesin and in air, to satisfy at least one of the following (1) to (3):

$$0.5 \leq Mb/Ma < 1.2 \tag{1}$$

wherein Ma represents a melt flow rate (g/10 min) of the fluororesin prior to the electron beam irradiation, and Mb represents a melt flow rate (g/10 min) of the fluororesin after the electron beam irradiation, $$1 \leq Tb - Ta < 6.5 \tag{2}$$

wherein Ta represents a crystalline melting point (° C.) of the fluororesin prior to the electron beam irradiation, and Tb is a crystalline melting point (° C.) of the fluororesin after the electron beam irradiation, $$\text{irradiation dose of less than 30 kGy.} \tag{3}$$

[6] The method for producing a resin material containing a modified fluororesin according to [5], wherein the fluororesin is a copolymer comprising a structural unit (a1) based on a hydrocarbon monomer having either one or both of a carboxy group and an acid anhydride group, a structural unit (b1) based on tetrafluoroethylene, and a structural unit (b2) based on a perfluoromonomer (but excluding tetrafluoroethylene), and based on the total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %.

[7] A process for producing a molded article, which comprises a step of obtaining a resin material containing a modified fluororesin by the method for producing a resin material containing a modified fluororesin as defined in

[6], and a step of obtaining a molded article by molding the resin material containing the modified fluororesin.

Advantageous Effects of Invention

According to the present invention, it is possible to provide a production method capable of improving the abrasion resistance of an electric wire or molded article using a fluororesin by electron beam irradiation in air at a temperature where the fluororesin does not melt, and a method for producing a resin material containing a modified fluororesin whereby an electric wire or molded article excellent in abrasion resistance is obtainable.

DESCRIPTION OF EMBODIMENTS

In this specification, a "structural unit" is meant for a unit based on a monomer, which is formed by polymerization of the monomer. A structural unit may be a unit formed directly by a polymerization reaction or may be a unit having part of a unit of a polymer converted to another structure by treating the polymer.

In this specification a "monomer" is meant for a compound having a polymerizable unsaturated bond, i.e. a polymerizable carbon-carbon double bond. A "fluoromonomer" is meant for a monomer having fluorine atom(s) in its molecule, and a "non-fluoromonomer" is meant for a monomer having no fluorine atom in its molecule. A "hydrocarbon monomer" is meant for a monomer having a hydrocarbon group and having no fluorine atom in its molecule.

A "modified fluororesin" is meant for a fluororesin which exhibits a different value in either one or both of the fluidity and the crystalline melting point as compared with the fluororesin before being modified (i.e. before irradiation of the electron beam). In the fluidity, a behavior to decrease is observed after irradiation, as compared with prior to irradiation, and in the crystalline melting point, a behavior to rise is observed after irradiation, as compared with prior to irradiation.

<<Method For Producing Electric Wire>>
First Embodiment

A first embodiment of the method for producing an electric wire of the present invention, is a method for producing an electric wire comprising a conductor and an insulating layer containing a fluorine resin and covering the surface of the conductor, which comprises a step of irradiating an electron beam to the insulating layer containing a fluororesin and covering the surface of the conductor, to modify at least part of the fluororesin to a modified fluororesin thereby to form an insulating layer containing the modified fluororesin (hereinafter referred to also as "electron beam irradiation step (I)") characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)), and does not contain a structural unit based on a hydrocarbon monomer (but excluding the structural unit (a)), and Irradiation of the electron beam is conducted under conditions of a temperature of less than the crystalline melting point of the fluororesin and in air, to satisfy the following formula (1):

$$0.5 \leq Mb/Ma < 1.2 \quad (1)$$

Wherein Ma represents a melt flow rate (g/10 min) of the fluororesin prior to the electron beam irradiation, and Mb is a melt flow rate (g/10 min) of the fluororesin after the electron beam irradiation.

<Electron Beam Irradiation Step (I)>

In the electron beam irradiation step (I), an electron beam is irradiated to an insulating layer A of an electric wire (hereinafter referred to also as an electric wire A) comprising a conductor (core wire) and an insulating layer (hereinafter referred to also as an insulating layer A) containing a fluororesin and covering the surface of the conductor. At least part of the fluororesin contained in the insulating layer A is thereby modified to become a modified fluororesin, whereby an insulating layer (hereinafter referred to also as an insulating layer B) containing the modified fluororesin will be formed, and an electric wire (hereinafter referred to also as an electric wire B) comprising the conductor and the insulating layer (hereinafter referred to also as the insulating layer B) containing the modified fluororesin and covering the surface of conductor will be obtained.

The conductor is not particularly limited, and it may, for example, be copper, a copper alloy, aluminum, an aluminum alloy, various plated wires such as tin plated, silver plated, nickel plated, etc., a twisted wire, a superconductor, a semiconductor device lead plated wire, etc.

The fluororesin will be described later in detail.

The insulating layer A may be one made of a fluororesin, or one having an inorganic filler, an organic filler, etc. added to a fluororesin. The insulating layer A is preferably made of a fluororesin, since the electrical properties, chemical resistance, heat resistance, low elution property, etc. specific to the fluororesin can be thereby utilized sufficiently. Here, the term "made of a fluororesin" means that a fluororesin is contained as the main component, and specifically means that a fluororesin is contained in an amount of at least 50 mass %, preferably at least 75 mass %, more preferably at least 85 mass %.

As the electric wire A, if one comprising a conductor and an insulating layer A is commercially available, such a commercial product may be used, or it may be prepared by a known method.

Covering of the conductor by the fluororesin can be carried out by a known method. In a case where the fluororesin is a melt-moldable one, a molding method (a so-called wire extrusion molding) of extruding the melted fluororesin to cover a conductor for an electric wire by means of an extruder, is preferred.

In the case of carrying out a molding step for producing an electric wire A, it is also preferred to combine the molding step and the electron beam irradiation step (I) in a continuous process, in that the cost merit is thereby high. As such an example, a process is conceivable wherein in the electric wire extrusion molding, a fluororesin is melted and fused to a conductor and thereby cooled, and the solidified fluororesin (the insulation layer A) is withdrawn and/or wound up while being irradiated with an electron beam.

The electron beam irradiation step (I) is carried out under conditions of a temperature of less than the crystalline melting point of the fluororesin and in air. The temperature during electron beam irradiation is less than the crystalline melting point (Ta) of the fluororesin, preferably at least (Ta −290° C.) and at most (Ta −5° C.), more preferably at least (Ta −280° C.) and at most (Ta −200° C.).

By carrying out electron beam irradiation at a temperature of less than Ta, in particular at a temperature of at most (Ta −5° C.), a problem such as deformation of the insulating layer A during the following electron beam irradiation, or press bonding to other member is less likely to occur.

When the temperature during electron beam irradiation is at least (Ta −290° C.), dimensional stability of the molded article is good.

It is preferred to carry out electron beam irradiation in air (in the presence of oxygen), in that it is thereby easy to form a reaction point of the perfluoropolymer, and further in view of the productivity and safety.

In this embodiment, the electron beam irradiation under the above conditions, is carried out so as to satisfy the above formula (1).

Mb/Ma is an index showing the displacement in the melt flow rate (i.e. MFR) of the fluororesin as between before and after irradiation of the electron beam.

Mb/Ma is at least 0.5 and less than 1.2, preferably at least 0.6 and less than 1.1, particularly preferably at least 0.7 and less than 1.0.

When Mb/Ma satisfies the formula (1), the abrasion resistance is improved, and the mechanical strength, etc. are also well maintained. If Mb/Ma is less than the lower limit value in the above range, the abrasion resistance of the insulating layer B will not be good. If Mb/Ma is larger than the upper limit value in the above range, no substantial change will be observed between the abrasion resistance of the insulation layer A and the abrasion resistance of the insulating layer B.

Mb/Ma can be adjusted by the irradiation dose of the electron beam. For example, as the irradiation dose of the electron beam is small, Mb/Ma tends to be large (i.e. the displacement in MFR tends to be small).

In this embodiment, it is preferred to carry out irradiation of the electron beam to satisfy the following formula (3), in addition to the formula (1). The abrasion resistance of the insulation layer B will thereby be made to be better.

$$Wb/Wa \geq 0.6 \tag{3}$$

wherein Wa is the tensile strength (MPa) of the fluororesin (fluororesin A) prior to the electron beam irradiation, and Wb is the tensile strength (MPa) of the fluororesin (fluororesin B) after the electron beam irradiation.

Wb/Wa is an index showing the displacement in the mechanical strength between before and after the irradiation of the electron beam.

Wb/Wa is at least 0.6, preferably at least 0.7 and less than 1.2, more preferably at least 0.7 and less than 1.1, and particularly preferably at least 0.75 and less than 1.0.

When Wb/Wa is at least 0.6, better abrasion resistance is obtainable. If Wb/Wa is 1.2 or more, no substantial change will be observed between the abrasion resistance of the insulation layer A and the abrasion resistance of the insulating layer B.

Wb/Wa can be adjusted by the irradiation dose of the electron beam. For example, as the irradiation dose of the electron beam is small, Wb/Wa tends to be large (i.e. the displacement in the mechanical strength tends to be small).

<Fluororesin>

In the present invention, a fluororesin to which the electron beam is irradiated, has a crystalline melting point (crystalline melting temperature) of at least 260° C. The crystalline melting point of the fluororesin is preferably from 260 to 330° C., more preferably from 260 to 320° C., particularly preferably from 280 to 310° C. When the crystalline melting point of the fluororesin is at least the lower limit value in the above-mentioned range, the fluororesin will be excellent in mechanical properties such as abrasion resistance, tensile strength, tensile elongation, elastic modulus, etc., and when it is at most the upper limit value in the above range, the fluororesin will be excellent in moldability.

The crystalline melting point of the fluororesin can be adjusted by the types and contents of structural units that constitute the fluororesin, the molecular weight, etc. For example, as the ratio of the structural unit based on tetrafluoroethylene becomes large, the crystalline melting point tends to be high.

The average molecular weight of the fluororesin may usually be from 2,000 to 1,000,000.

The fluororesin has a melt flow rate (hereinafter referred to as "MFR") of preferably from 1 to 200 g/10 min, more preferably from 2 to 100 g/10 min, particularly preferably from 3 to 50 g/10 min. When MFR is at least the lower limit value in the above range, the fluororesin shows melt flowability and is melt-moldable, whereby it is excellent in moldability. When MFR is at most the upper limit value in the above range, the fluororesin will be excellent in mechanical properties, abrasion resistance, etc.

In the present invention, MFR is a value which is measured under a load of 49N at a temperature higher by at least 20° C. than the crystalline melting point (usually 372° C. is adopted).

MFR is an index for the molecular weight of the fluororesin, i.e. the larger the MFR, the smaller the molecular weight, and the smaller the MFR, the larger the molecular weight. The molecular weight of the fluororesin, and thus MFR, can be adjusted by the production conditions of the fluororesin. For example, if the polymerization time at the time of polymerization of the monomer is shortened, MFR tends to be large.

Of the fluororesin, the tensile strength measured by the following measuring method, is preferably from 5 to 100 MPa, more preferably from 5 to 60 MPa, particularly preferably from 7 to 55 MPa. When the tensile strength is at least the lower limit value in the above range, the fluororesin is excellent in abrasion resistance, and when it is at most the upper limit, the fluororesin is excellent flexibility. Here, the tensile strength is the value of the fluororesin prior to the electron beam irradiation.

[Method For Measuring Tensile Strength]

In accordance with JIS K6251: 2010, No. 3 dumbbell-shaped test pieces (thickness 1 mm) are prepared from a fluororesin. With respect to five test pieces, a tensile strength/elongation test is conducted under conditions of a gauge length of 20 mm at a tensile speed of 200 m/min. by means of "Strograph" manufactured by Toyo Seiki Seisakusho, Ltd., in a constant temperature/constant humidity environment controlled to a temperature 23±2° C. under a humidity of 50%±10%, to obtain the stress (MPa) at the maximum point load. An average value of the obtained stress is calculated, and the average value is adopted as the tensile strength.

The fluororesin contains either one or both of a structural unit (a) having a carbonyl group-containing group and a main chain terminal group (a') having a carbonyl group-containing group. By the presence of carbonyl group-containing groups in the fluororesin, it is possible to improve the abrasion resistance of the fluororesin by electron beam irradiation under conditions of in air and at a temperature of less than the crystalline melting point of the fluororesin.

The fluororesin may have only either one of the structural unit (a) and the main chain terminal group (a') or may have both of them. From such a viewpoint that the reaction point tends to be readily generated by the electron beam, it is preferred to have at least the structural unit (a).

A carbonyl group-containing group is a group containing a carbonyl group (—C(=O)—) in its structure.

As the carbonyl group-containing group, a carbonate group, a carboxy group, a haloformyl group, an alkoxycarbonyl group, an amide group, or an acid anhydride residue is preferred, and a haloformyl group, an alkoxycarbonyl group, an amide group, or an acid anhydride residue is more preferred.

A haloformyl group is represented by —C(=O)—X (wherein X is a halogen atom). As the halogen atom in the haloformyl group, a fluorine atom, or a chlorine atom may be mentioned. As the haloformyl group, a fluoroformyl group (also referred to as a carbonyl fluoride group) is preferred.

The alkoxy group in an alkoxycarbonyl group (also referred to as an ester group) may be linear or branched, and is preferably a $C_{1-8}$ alkoxy group. As the alkoxycarbonyl group, a methoxycarbonyl group or an ethoxycarbonyl group is, for example, particularly preferred.

Carbonyl group-containing groups in the fluororesin may be one type, or two or more types.

As the carbonyl group-containing group, an acid anhydride residual group is most preferred from such a viewpoint that the effect of improving the abrasion resistance by the operation of the electron beam irradiation under the predetermined conditions is thereby excellent.

The structural unit (a) may, for example, be a structural unit based on a monomer having a carbonyl group-containing group, a structural unit having a carbonyl group-containing group formed by pyrolysis of a structural unit based on a monomer having a functional group which forms a carbonyl group-containing group by thermal decomposition, or a structural unit having a carbonyl group-containing group introduced by reacting a structural unit based on a monomer having a reactive functional group with a compound having a functional group reactive with the reactive functional group and a carbonyl group-containing group.

As the structural unit (a), the structural unit based on a monomer having a carbonyl group-containing group is preferred.

The monomer having a carbonyl group-containing group may be a fluoromonomer or a non-fluoromonomer.

The fluoromonomer having a carbonyl group-containing group may, for example, be $CF_2=CFOR^fCO_2X^2$ (wherein $R^f$ is a $C_{1-10}$ perfluoroalkyl group or a $C_{2-10}$ perfluoroalkyl group containing an oxygen atom between carbon atoms, and $X^2$ is a hydrogen atom or a $C_{1-3}$ alkyl group).

The non-fluoromonomer having a carbonyl group-containing group may, for example, be a hydrocarbon monomer having either one or both of a carboxyl group and an acid anhydride group (hereinafter referred to also as "AM monomer"); a vinyl ester such as vinyl acetate; etc.

As the AM monomer, a dicarboxylic acid such as itaconic acid, citraconic acid, 5-norbornene-2,3-dicarboxylic acid or maleic acid; an acid anhydride of a dicarboxylic acid such as itaconic anhydride (hereinafter referred to also as "IAH"), citraconic anhydride (hereinafter referred to also as "CAH"), 5-norbornene-2,3-dicarboxylic anhydride (hereinafter referred to also as "NAH") or maleic anhydride; may, for example, be mentioned. One of them may be used alone, or two or more of them may be used in combination.

As the monomer having a carbonyl group-containing group, from the viewpoint of thermal stability, an AM monomer is preferred. Among them, at least one member selected from the group consisting of IAH, CAH and NAH is preferred. By the use of at least one member selected from the group consisting of IAH, CAH and NAH, it is possible to easily produce a fluororesin containing an anhydride residual group without using a special polymerization method (see JP-A-11-193312) which is required when using maleic anhydride.

The main chain terminal group (a') may, for example, be an alkoxycarbonyl group, an alkoxycarbonyloxy group, a carboxy group or a carbonyl fluoride group.

The main chain terminal group of a fluororesin can be introduced by using one having a predetermined functional group, as a radical polymerization initiator or chain transfer agent to be used in the production of the fluororesin. When a radical polymerization initiator or chain transfer agent having a carbonyl group-containing group as a functional group to be introduced into the main chain terminal is used, a fluororesin having a main chain terminal group (a') can be obtained directly by the polymerization reaction. When a radical polymerization initiator or chain transfer agent having a functional group which forms a carbonyl group-containing group by thermal decomposition as a functional group to be introduced at a main chain terminal, is used, and the main chain terminal group of the obtained fluororesin is thermally decomposed, a fluororesin having a main chain terminal group (a') is obtainable. When a radical polymerization initiator or chain transfer agent having a reactive functional group as a functional group to be introduced into the main chain terminal, is used, and the main chain terminal group of the obtained fluororesin is reacted with a compound having a functional group reactive with the reactive functional group and a carbonyl group-containing group, a fluororesin having a main chain terminal group (a') is obtainable.

The radical polymerization initiator to be used to introduce the main chain terminal group may, for example, be tertiary butyl peroxypivalate or perfluorobutyroyl peroxide.

The chain transfer agent to be used to introduce the main chain terminal group may, for example, be a chain transfer agent having a functional group such as an ester group, a carbonate group, a hydroxy group, a carboxy group, carbonyl fluoride group. Specifically, acetic acid, acetic anhydride, methyl acetate, ethylene glycol or propylene glycol may be mentioned.

The content of the structural unit (a) and/or the main chain terminal group (a') in the fluororesin is preferably in such an amount that the content of carbonyl group-containing groups in the fluororesin would be within a range of from 10 to the 60,000 groups to $1\times10^6$ carbon atoms in the main chain of the fluororesin. The content of carbonyl group-containing groups in the fluororesin is more preferably from 100 to 10,000 groups, particularly preferably from 300 to 5,000 groups, to $1\times10^6$ carbon atoms in the main chain of the fluororesin. When the content of the carbonyl group-containing groups is at least the lower limit value in the above range, the reactivity will be excellent, and when it is at most the upper limit value in the above range, the thermal stability will be excellent.

The content (the number) of carbonyl group-containing groups can be measured by a method such as a nuclear magnetic resonance (NMR) analysis or an infrared absorption spectrum analysis. For example, using a method such as an infrared absorption spectrum analysis as described in JP-A-2007-314720, the proportion (mol %) of the structural unit having a carbonyl group-containing group to the total of all the structural units that constitute the fluororesin is obtainable, and from that proportion, it is possible to calculate the content of carbonyl group-containing groups.

The fluororesin contains a structural unit (b) based on a perfluoromonomer.

The perfluoromonomer may, for example, be a perfluoroolefin, a perfluoro(alkyl vinyl ether), a perfluoro(oxaalkyl vinyl ether), a perfluoro(alkyl allyl ether), $CF_2$=$CFOR^fO_2X^1$ (wherein $R^f$ is a $C_{1-10}$ perfluoroalkyl group, or a $C_{2-10}$ perfluoroalkyl group containing an oxygen atom between carbon atoms, and $X^1$ is a fluorine atom or a hydroxy group), $CF_2$=$CF(CF_2)_pOCF$=$CF_2$ (wherein p is 1 or 2) or a perfluoro(2-methylene-4-methyl-1,3-dioxolane).

As the perfluoromonomer, among the above, at least one member selected from the group consisting of tetrafluoroethylene (TFE), hexafluoropropene (HFP) and a perfluoro (alkyl vinyl ether) is preferred.

As the perfluoro(alkyl vinyl ether), for example, $CF_2$=$CFOR^{f1}$(wherein $R^{f1}$ is a $C_{1-10}$ perfluoroalkyl group) may be mentioned.

As $CF_2$=$CFOR^{f1}$, $CF_2$=$CFOCF_2(CF_2)_pF$ (wherein p is an integer of from 0 to 2) is preferred.

As specific examples of $CF_2$=$CFOR^{f1}$, $CF_2$=$CFOCF_2CF_3$, $CF_2$=$CFOCF_2CF_2CF_3$, $CF_2$=$CFOCF_2CF_2CF_2CF_3$, $CF_2$=$CFO(CF_2)_8F$, etc. may be mentioned, and $CF_2$=$CFOCF_2CF_2CF_3$ (hereinafter referred to also as "PPVE") is preferred.

As the perfluoro(oxaalkyl vinyl ether), for example, $CF_2$=$CFOR^{f2}$(wherein $R^{f2}$ is a $C_{2-10}$ perfluoroalkyl group containing an oxygen atom between carbon atoms) may be mentioned.

As $CF_2$=$CFOR^{f2}$, $CF_2$=$CF[OCH_2CFX(CF_2)_m]_nOCF_2(CF_2)_pF$ (wherein m is 0 or 1, n is an integer of from 1 to 5, p is an integer of from 0 to 2, and X is a fluorine atom or a trifluoromethyl group when m is 0, or a fluorine atom when m is 1) is preferred.

The fluororesin contains, as the constituent unit (b), preferably at least a structural unit (b1) based on TFE, more preferably a structural unit (b1) and a structural unit (b2) based on a perfluoromonomer (but excluding TFE).

As the structural unit (b2), at least one member selected from the group consisting of a structural unit based on hexafluoropropylene (HFP) and a structural unit based on a perfluoro(alkyl vinyl ether) is preferred.

As preferred examples of the structural unit (b) in the fluororesin, the following (X1) to (X3) may be mentioned. When the structural unit (b) is (X1), the fluororesin is a polytetrafluoroethylene polymer (PTFE). When the structural unit (b) is (X2), the fluororesin is a tetrafluoroethylene-hexafluoropropylene copolymer (FEP). When the structural unit (b) is (X3), the fluororesin is a tetrafluoroethylene-perfluoroalkyl vinyl ether copolymer (PFA).

(X1) The structural unit (b1) only.

(X2) A combination of the structural unit (b1) and a structural unit based on HFP.

(X3) A combination of the structural unit (b1), and a structural unit based on a perfluoro(alkyl vinyl ether).

As the structural unit (b), (X2) or (X3) is preferred, and (X3) is particularly preferred.

In (X2), the proportion of the structural unit (b1) to the total of the structural unit (b1) and the structural unit based on HFP, is preferably from 87 to 96 mass %.

In (X3), the proportion of the structural unit (b1) to the total of the structural unit (b1) and the structural unit based on a perfluoro(alkyl vinyl ether), is preferably from 92 to 99 mass %.

The content of the structural unit (b) in the fluororesin is preferably at least 80 mol %, more preferably at least 90 mol %, particularly preferably at least 95 mol %, based on the total of all structural units constituting the fluororesin.

In a case where the fluororesin contains the structural unit (a), the upper limit for the content of the structural unit (b) may be suitably set in consideration of the contents of the structural unit (a) and other structural units which may optionally be contained. In a case where the fluororesin contains the main chain terminal group (a') and does not contain the structural unit (a), the upper limit may be suitably set in consideration of the content of other structural units which may optionally be contained, and may be 100 mol %.

The fluororesin may further contain another structural unit (hereinafter referred to also as an "optional structural unit") other than the structural unit (a) and the structural unit (b) within a range not to impair the effects of the present invention.

However, the fluororesin does not contain a structural unit based on a hydrocarbon monomer (but excluding the structural unit (a)). As such a hydrocarbon monomer, an olefin such as ethylene or propylene, may, for example, be mentioned.

The optional structural unit may, for example, be one having some of fluorine atoms of the above-mentioned perfluoroalkyl monomer substituted by a hydrogen atom, a chlorine atom, etc. Specific examples include a structural unit based on a fluoroolefin (but excluding a perfluoroolefin) such as vinyl fluoride, vinylidene fluoride (hereinafter referred to also as "VdF"), trifluoroethylene, chlorotrifluoroethylene (hereinafter referred to also as "CTFE"), a structural unit based on $CH_2$=$CX^3(CF_2)_qX^4$ (wherein $X^3$ is a hydrogen atom or a fluorine atom, and q is an integer of from 2 to 10), etc.

From the viewpoint of the effectiveness of the present invention, it is preferred that the fluororesin does not contain a structural unit based on a monomer having a carbon-hydrogen bond (but excluding the structural unit (a)).

As the fluororesin, preferred is a copolymer (hereinafter referred to also as a "copolymer (I)") containing a structural unit (a1)) based on the AM monomer, a structural units (b1) based on TFE, and a structural unit (b2) based on a perfluoromonomer (but excluding TFE).

Here, the structural unit (a1) is derived from the AM monomer and has either one or both of a carboxy group and an acid anhydride group, which corresponds to the carbonyl group-containing group.

The copolymer (I) may have a main chain terminal group (b') or may not have it.

The AM monomer and the perfluoromonomer may, respectively, be the same as described above. As the perfluoromonomer in the structural unit (b2), HFP or a perfluoro(alkyl vinyl ether) is preferred. As the perfluoro(alkyl vinyl ether), $CF_2$=$CFOR^{f1}$ is preferred, and PPVE is particularly preferred.

The copolymer (I) may further contain another structural unit other than the above structural units (a1), (b1) and (b2) within a range not to impair the effects of the present invention. Another structural unit may be the same as those mentioned above as the optional structural unit.

In the copolymer (I), based on the total molar amount of the structural unit (a1), the structural unit (b1) and the structural unit (b2), it is preferred that the structural unit (a1) is from 0.01 to 5 mol %, the structural unit (b1) is from 50 to 99.89 mol %, and the structural unit (b2) is from 0.1 to 49.99 mol %, it is more preferred that the structural unit (a1) is from 0.1 to 3 mol %, the structural units (b1) is from 50 to 99.4 mol %, and the structural unit (b2) is from 0.5 to 49.9 mol %, and it is particularly preferred that the structural unit (a1) is from 0.1 to 2 mol %, the structural unit (b1) is from 50 to 98.9 mol %, and the structural unit (b2) is from 1 to 49.9 mol %.

When the contents of the respective structural units are within the above ranges, the copolymer (I) is excellent in heat resistance and chemical resistance, and excellent also in mechanical strength.

In particular, when the content of the structural unit (a1) is within the above range, the amount of carbonyl-containing groups of the copolymer (I) becomes an appropriate amount, and at the time of polymerization, the concentration of the AM monomer also becomes to be an appropriate amount, whereby as described below, it is easy to avoid a decrease in the polymerization rate due to an increase of the monomer concentration.

When the content of the structural unit (b2) is within the above range, the copolymer (I) is excellent in moldability, and a molded article of a modified fluororesin obtained from the copolymer (I) will be excellent in mechanical properties, such as stress cracking resistance, etc.

In the copolymer (I), the total molar amount of the structural unit (a1), the structural unit (b1) and the structural unit (b2) is preferably at least 60 mol %, more preferably at least 70 mol %, based on the total molar amount of all structural units constituting the copolymer (I). The preferred upper limit is 100 mol %.

Here, in a case where the copolymer (I) is composed of the structural unit (a1), the structural unit (b1) and the structural unit (b2), the structural unit (a1)) being 0.01 mol % based on the total molar amount of these structural units, corresponds to the content of carbonyl-containing groups in the copolymer (I) being 100 groups to $1 \times 10^6$ carbon atoms in the main chain of the copolymer (I), and the structural unit (a1)) being 5 mol % based on the above total molar amount, corresponds to the content of carbonyl group-containing groups in the copolymer (I) being 50,000 groups to $1 \times 10^6$ carbon atoms in the main chain of the copolymer (I).

Even when the carbonyl group-containing group in the AM monomer is only an acid anhydride residual group, the structural unit based on the AM monomer may partially be hydrolyzed, and as a result, there may be a case where the copolymer (I) contains a structural unit based on a dicarboxylic acid (itaconic acid, citraconic acid, 5-norbornene-2,3-dicarboxylic acid, maleic acid, etc.) corresponding to the acid anhydride residual group. If it contains a structural unit based on the dicarboxylic acid, the content of such a structural unit shall be included in the structural unit (a1).

The content of each structural unit can be calculated by e.g. the melt NMR analysis, fluorine content analysis and infrared absorption spectrum analysis of the copolymer (I).

Preferred specific examples of the copolymer (I) may be an TFE/PPVE/NAH copolymer, a TFE/PPVE/IAH copolymer, a TFE/PPVE/CAH copolymer, a TFE/HFP/IAH copolymer, a TFE/HFP/CAH copolymer, etc.

As the above fluororesin, if a desired fluororesin is commercially available, such a commercial product may be used, or it may be prepared from various starting material compounds by a suitable method such as polymerization.

As the method for producing the fluororesin, for example, the following (1) to (4), etc. may be mentioned.

(1) A method of using a monomer having a carbonyl group-containing group (e.g. an AM monomer) at the time of producing the fluororesin by a polymerization reaction.

(2) A method of producing the fluororesin by a polymerization reaction by using a radical polymerization initiator or chain transfer agent having a carbonyl group-containing group.

(3) A method of heating a fluororesin having a thermally decomposable moiety to form a carbonyl group-containing group by thermal decomposition, to partially pyrolyze the fluororesin to produce a carbonyl-containing group, thereby to obtain a fluororesin having a carbonyl group-containing group.

(4) A method of introducing a carbonyl group-containing group to a fluororesin having no carbonyl group-containing group, by graft-polymerizing a monomer having a carbonyl group-containing group, to the fluororesin.

As the method for producing the fluororesin, the method of (1) is preferred.

When the fluororesin is produced by a polymerization reaction, the polymerization method is not particularly limited, and, for example, a polymerization method using a radical polymerization initiator may be employed.

As the radical polymerization initiator, the temperature at which its half-life is 10 hours, is preferably from 0 to 100° C., more preferably from 20 to 90° C. Specific examples include azo compounds such as azobisisobutyronitrile, etc., non-fluorinated diacyl peroxides such as isobutyryl peroxide, octanoyl peroxide, benzoyl peroxide, lauroyl peroxide, etc., peroxydicarbonates such as diisopropyl peroxydicarbonate, etc., peroxy esters such as tert-butyl peroxypivalate, tert-butyl peroxyisobutyrate, tert-butyl peroxyacetate, etc., fluorinated diacylperoxides such as a compound represented by $(Z(CF_2)_rCOO)_2$ (wherein Z is a hydrogen atom, a fluorine atom or a chlorine atom, and r is an integer of form 1 to 10), inorganic persulfate compounds such as potassium persulfate, sodium persulfate, ammonium persulfate, etc.

The polymerization method may, for example, be bulk polymerization, solution polymerization using an organic solvent such as a fluorinated hydrocarbon, a chlorinated hydrocarbon, a fluorinated chlorinated hydrocarbon, an alcohol or a hydrocarbon, suspension polymerization using an aqueous medium and, if necessary, a suitable organic solvent, emulsion polymerization using an aqueous medium and an emulsifier, etc. Preferred is a solution polymerization.

The polymerization conditions are not particularly limited, and the polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

In the case of polymerizing an AM monomer as a monomer having a carbonyl group-containing group, the concentration of the AM monomer during the polymerization is preferably from 0.01 to 5 mol %, more preferably from 0.1 to 3 mol %, particularly preferably from 0.1 to 1 mol %, based on the total of all monomers. When the concentration of the AM monomer is within the above range, the polymerization rate will be excellent. If the concentration of the AM monomer is too high, the polymerization rate tends to decrease.

During the polymerization, as the AM monomer is consumed by polymerization, it is preferred to continuously or intermittently supplement the consumed amount into the polymerization reactor, to maintain the concentration of the AM monomer to be within the above range.

During the polymerization, in order to control MFR of the fluororesin, it is possible to use a chain transfer agent.

The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane.

By using, as the chain transfer agent, a chain transfer agent having a functional group such as an ester group, a carbonate group, a hydroxy group, a carboxy group or a carbonyl fluoride group, it is possible to introduce the functional group into a main chain terminal of the fluororesin. As such a chain transfer agent, acetic acid, acetic anhydride, methyl acetate, ethylene glycol or propylene glycol may be mentioned.

(Second Embodiment)

The second embodiment of the method for producing an electric wire of the present invention is the same as the first embodiment, except that the irradiation of the electron beam in the electron beam irradiation step (I) is carried out to satisfy the following formula (2) instead of the above formula (1).

$$1 \leq Tb - Ta < 6.5 \quad (2)$$

wherein Ta is the crystalline melting point (° C.) of the fluororesin (fluororesin A) prior to the electron beam irradiation, and Tb is the crystalline melting point (° C.) of the fluororesin (fluororesin B) after the electron beam irradiation.

Tb−Ta is an index showing the displacement in the crystalline melting point of the fluororesin between before and after the irradiation of the electron beam.

Tb−Ta is preferably at least 1 and less than 5, particularly preferably at least 1 and less than 4.

If Tb−Ta exceeds the upper limit value in the above range, the abrasion resistance of the layer of the fluororesin B will not be good. If Tb−Ta is less than the lower limit value in the above range, no substantial change between the abrasion resistance of the layer of the fluororesin A and the abrasion resistance of the layer of the fluororesin B will be observed.

In this embodiment, it is preferred to carry out the irradiation of the electron beam so as to satisfy the above formula (3) in addition to the formula (2). The abrasion resistance of the insulation layer B will thereby become better.

In this embodiment, it is not essential to satisfy the above formula (1), but it is preferred to satisfy the formula (1) like the first embodiment.

(Third Embodiment)

The third embodiment of the method for producing an electric wire of the present invention is the same as the first embodiment, except that the irradiation of the electron beam in the electron beam irradiation step (I) is carried out in an irradiation dose of less than 30 kGy instead of performing it so as to satisfy the above formula (1).

The irradiation dose is preferably at least 0.01 kGy, further preferably at least 0.1 kGy. Further, the irradiation dose is preferably less than 25 kGy, more preferably less than 10 kGy.

If the irradiation dose is 30 kGy or more, embrittlement of the fluororesin is promoted, and the physical properties such as abrasion resistance, mechanical strength, etc. will substantially decrease. If the irradiation dose is less than 0.01 kGy, due to deficiency of the irradiation dose required for abrasion resistance, there may be a case where no improvement is observed in abrasion resistance.

In this embodiment, it is preferred to carry out the irradiation of the electron beam so as to satisfy the above formula (3) in addition to the formula (2). The abrasion resistance of the insulation layer B will thereby become better.

In this embodiment, it is not essential to satisfy the above formula (1), but it is preferred to satisfy the formula (1) like the first embodiment.

In this embodiment, it is not essential to satisfy the formula (2), but it is preferred to satisfy the formula (2) like the second embodiment.

<<Method For Producing Molded Article>>

(First Embodiment)

The first embodiment of the method for producing a molded article of the present invention comprises a step (hereinafter referred to also as an "electron beam irradiation step (II)") of irradiating an electron beam to a molded article containing a fluororesin, to modify at least part of the fluororesin to a modified fluororesin, thereby to obtain a molded article containing said modified fluororesin, characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)) and does not contain a structural unit based on a hydrocarbon monomer (but excluding the structural unit (a)), and irradiation of the electron beam is conducted under conditions of a temperature of less than the crystalline melting point of the fluororesin and in air, to satisfy the following formula (1):

$$0.5 \leq Mb/Ma < 1.2 \quad (1)$$

wherein Ma represents a melt flow rate (g/10 min) of the fluororesin prior to the electron beam irradiation, and Mb represents a melt flow rate (g/10 min) of the fluororesin after the electron beam irradiation.

<Electron Beam Irradiation Step (II)>

In the electron beam irradiation step (II), the molded article containing a fluororesin (hereinafter referred to also as the molded article A) is irradiated with an electron beam. At least part of the fluororesin contained in the molded article A is thereby modified to become a modified fluororesin, and the molded article containing the modified fluororesin (hereinafter referred to also as the molded article B) is obtainable.

As the fluororesin, the same one as the fluororesin mentioned in the above description of the method for producing an electrical wire, may be mentioned.

The molded article A may be one made of a fluororesin or one having an inorganic filler, an organic filler, etc. incorporated to a fluororesin. From such a viewpoint that the electrical properties, chemical resistance, heat resistance, low elution property, etc. specific to the fluororesin can be utilized sufficiently, the molded article A is preferably made of a fluororesin. Here, "made of a fluororesin" means that a fluororesin is contained as the main component, as described above, and specifically means that a fluororesin is contained in an amount of at least 50 mass %, preferably at least 75 mass %, more preferably at least 85 mass %.

Specific examples of the molded articles A may, for example, be films, tubes, bearings, gears, gear members, sliding members, electronics members, spacers, rollers, cams, etc. However, the molded article in the present invention is not limited thereto. Since the excellent abrasion resistance is obtainable by the electron beam irradiation, as the molded product A, a sliding member is preferred.

As the molded article A, if a molded article containing a predetermined fluororesin is commercially available, such a commercial product may be used, or it may be prepared by a known method.

As a production method of a molded article A, a melt molding method is preferred in a case where the fluororesin is melt-moldable. The melt molding method may, for example, be extrusion molding, injection molding, compression molding, blow molding, transfer molding or calender molding. In a case where the molded article A is a film, a tube or the like, extrusion molding is mainly employed, and in a case where the molded product A is a bearing, a gear, a gear member, a sliding member, an electronic member, a spacer, a roller, a cam or the like, injection molding is mainly employed. Melt molding can be carried out by means of a melt molding apparatus commonly used for melt molding, such as a melt heat press machine "hot pressing two barreled" (manufactured by Tester Sangyo Co., Ltd.).

In the case of carrying out the molding step for producing a molded article A, it is also preferred to combine the molding step and the electron beam irradiation step (II) in a continuous process, from such a viewpoint that the cost merit is high.

Irradiation of the electron beam in this embodiment is carried out in the same manner as the irradiation of the electron beam in the above-described first embodiment of the method for producing an electrical wire. Preferred conditions are also the same.

(Second Embodiment)

The second embodiment of the method for producing a molded article of the present invention is the same as the first embodiment, except that the irradiation of the electron beam in the electron beam irradiation step (II) is carried out so as to satisfy the following formula (2) instead of the above formula (1).

$$1 \leq Tb - Ta < 6.5 \qquad (2)$$

wherein Ta is the crystalline melting point (° C.) of the fluororesin (fluororesin A) prior to the electron beam irradiation, and Tb is the crystalline melting point (° C.) of the fluororesin (fluororesin B) after the electron beam irradiation.

Irradiation of the electron beam in this embodiment is carried out in the same manner as the irradiation of the electron beam in the above described second embodiment of the method for producing an electrical wire. Preferred conditions are also the same.

(Third Embodiment)

The third embodiment of the method for producing a molded article of the present invention is the same as in the first embodiment, except that the irradiation of the electron beam in the electron beam irradiation step (II) is carried out at an irradiation dose of less than 30 kGy instead of performing it so as to satisfy the above formula (1).

Irradiation of the electron beam in this embodiment is carried out in the same manner as the irradiation of the electron beam in the above-described third embodiment of the method for producing an electrical wire. Preferred conditions are also the same.

<<Method For Producing Resin Material Containing Modified Fluororesin>>

(First Embodiment)

The first embodiment of the method for producing a resin material containing a modified fluororesin, comprises a step of irradiating an electron beam to a resin material containing a fluororesin, to modify at least part of the fluororesin to a modified fluororesin, thereby to obtain a resin material containing said modified fluororesin (hereinafter referred to also as "electron beam irradiation step (III)), characterized in that the fluororesin has a crystalline melting point of at least 260° C., contains either one or both of a structural unit (a) having a carbonyl group-containing group and a main chain terminal group (a') having a carbonyl group-containing group, and a structural unit (b) based on a perfluoromonomer (but excluding the structural unit (a)) and does not contain a structural unit based on a hydrocarbon monomer (but excluding the structural unit (a)), and irradiation of the electron beam is conducted under conditions of a temperature of less than the crystalline melting point of the fluororesin and in air, to satisfy the following formula (1):

$$0.5 \leq Mb/Ma < 1.2 \qquad (1)$$

wherein Ma represents a melt flow rate (g/10 min) of the fluororesin prior to the electron beam irradiation, and Mb represents a melt flow rate (g/10 min) of the fluororesin after the electron beam irradiation.

<Electron Beam Irradiation Step (III)>

In the electron beam irradiation step (III), a resin material containing a fluororesin (hereinafter referred to also as a resin material A) is irradiated with an electron beam. At least part of the fluororesin contained in the resin material A is thereby modified to become a modified fluororesin, and a resin material containing the modified fluororesin (hereinafter referred to also as a resin material B) is obtainable.

As the fluororesin, the same one as the fluororesin mentioned in the above description of the method for producing an electrical wire may be mentioned.

The resin material A may be one made of a fluororesin, or one having an inorganic filler, an organic filler, etc. incorporated to a fluororesin. From such a view point that the electrical properties, chemical resistance, heat resistance, low elution property, etc. specific to a fluororesin can be utilized sufficiently, the resin material A is preferably made of a fluororesin. Here, "made of a fluororesin" means that a fluororesin is contained as the main component, as described above, and specifically means that a fluorine resin is at least 50 mass %, preferably at least 75 mass %, more preferably at least 85 mass %.

Irradiation of the electron beam in this embodiment is carried out in the same manner as the irradiation of the electron beam in the above first embodiment of the method for producing an electrical wire. Preferred conditions are also the same.

(Second Embodiment)

The second embodiment of the method for producing a resin material containing the modified fluororesin of the present invention is the same as the first embodiment, except that the irradiation of the electron beam in the electron beam irradiation step (III) is carried out so as to satisfy the following formula (2) instead of the above formula (1).

$$1 \leq Tb - Ta < 6.5 \qquad (2)$$

wherein Ta is the crystalline melting point (° C.) of the fluororesin (fluororesin A) prior to the electron beam irradiation, and Tb is the crystalline melting point (° C.) of the fluororesin (fluororesin B) after the electron beam irradiation.

Irradiation of the electron beam in this embodiment is carried out in the same manner as the irradiation of the electron beam in the above second embodiment of the method for producing an electrical wire. Preferred conditions are also the same.

(Third Embodiment)

The third embodiment of the method for producing a resin material containing the modified fluororesin of the present invention is the same as in the first embodiment, except that the irradiation of the electron beam in the electron beam irradiation step (III) is carried out at an irradiation dose of less than 30 kGy, instead of performing it so as to satisfy the above formula (1).

Irradiation of the electron beam in this embodiment is carried out in the same manner as the irradiation of the electron beam in the above third embodiment of the method for producing an electrical wire. Preferred conditions are also the same.

(Application of Resin Material Containing Modified Fluororesin)

The application of the resin material B obtained by the method for producing a resin material containing a modified fluororesin of the present invention is not particularly limited, and the resin material B is useful in various applications, for example, as wire coating materials, films, tubes, bearings, gears, gear members, sliding members, electronics, spacers, rollers, cams, etc.

Because it is excellent in abrasion resistance, applications where high abrasion resistance is required are preferred, and a wire coating material, or a sliding member is preferred.

In these applications, the resin material B is typically used as a molded article made of a resin material B, or a structure having a member made of a resin material B and other member combined (e.g. an electrical wire, etc.).

The molded article may, for example, be one which is obtained by irradiating an electron beam under a predetermined condition to a precursor molded article having the resin material A molded into the desired shape, and molding the obtained resin material B into a final shape, or one which is obtained by irradiating an electron beam under a predetermined condition to beads or pellets of the resin material A and molding the obtained resin material B.

The structure having a member made of a resin material B and other member combined may, for example. be one which is obtained by irradiating an electron beam under a predetermined condition to a member made of the above-described resin material A in a structure having a member made of a resin material A and other member combined, or one which is obtained by irradiating an electron beam under a predetermined condition to beads or pellets of the above-described resin material A, molding the obtained resin material B, and combining it with other member.

As the molding method of a resin material A or B, it is possible to employ a known molding method. For example, the above-mentioned method of producing an electric wire or the method for producing a molded article may be employed.

When the electron beam is irradiated, the fluidity of the resin material A decreases, and the melt moldability decreases, and therefore, it is preferred to irradiate the electron beam to a molded article (including a molded member) obtained by molding the resin material A into a desired shape.

<<Method For Producing Molded Article>>
(Fourth Embodiment)

The fourth embodiment of the method for producing a molded article of the present invention, comprises a step of obtaining a resin material containing the modified fluororesin by the above-described method for producing a resin material containing the modified fluororesin of the invention and a step of obtaining a molded product by molding the resin material containing the modified fluororesin.

The step of obtaining a resin material containing the modified fluororesin may be carried out by any of the first to third embodiments of the method for producing a resin material containing the modified fluororesin.

The method for molding the resin material containing the modified fluororesin is not particularly limited, and a known molding method may be employed. For example, it can be molded by the above mentioned melt molding method.

<<Advantageous Effects>>

Heretofore, at the time of irradiating an electron beam to a perfluoro type fluororesin or its molded article, it has been common to carry out the irradiation under conditions of at a temperature of at least the crystal melting point and in the absence of oxygen (e.g., vacuum, etc.). The reason is such that as is different from a fluororesin containing a relatively large amount of carbon-hydrogen bonds, such as ETFE, PVdF, etc., a perfluoro type fluororesin wherein a carbon-fluorine bond occupies the most part, is weak in the intermolecular force, and when irradiated with the electron beam, degradation of the polymer occurs preferentially, and it is known that the physical properties is greatly reduced. Therefore, when irradiating an electron beam to the perfluoro type fluororesin, the irradiation is conducted at a temperature of at least the crystalline melting point in order to increase the freeness of the polymer, and in the absence of oxygen (e.g. vacuum, etc.) in order to suppress the oxidative decomposition.

However, in the present invention, surprisingly, by conducting the electron beam irradiation in air (i.e. in the presence of oxygen), it is possible to remarkably improve the abrasion resistance without bringing about deterioration of the mechanical strength, even with the fluororesin wherein a carbon-fluorine bond occupies the most part. Specifically, by electron beam irradiation at an irradiation dose of at most 30 kGy or at a low dose of radiation capable of satisfying the above formula (1) or (2), the reaction to form a three-dimensional network structure by the above-mentioned reaction of carbonyl group-containing groups one another in intra- and inter-molecules of said fluororesin, or by the reaction of active radicals generated when the polymer chains are cut, with the carbonyl group-containing groups, preferentially proceeds at the surface portion in contact with air, whereby the curing of the surface is possible. Thus, without causing deterioration of the mechanical strength, the abrasion resistance of the fluororesin is increased by the improvement of intermolecular force due to the curing of the surface. In particular, it is particularly effective in the scrape abrasion test in accordance with ISO 6722, which is a friction test by lateral reciprocating movement by common blade as an abrasion resistance test of an electric wire coating material.

Thus, according to the present invention, it is possible to improve the abrasion resistance of the perfluoro type fluororesin, only by electron beam irradiation. Heretofore, in order to improve the abrasion resistance, it has been common to incorporate additives such as fillers, cross-linking agents, etc., but, there is a concern that the additives are likely to impair the excellent electrical properties, chemical resistance, heat resistance, low elution properties, etc. specific to the perfluoro type fluororesin. In the present invention, it is not necessary to add these additives, and therefore, it is possible to obtain a modified fluororesin having not only excellent abrasion resistance, but also electrical properties, chemical resistance, heat resistance, low elution property, etc. specific to the fluororesin sufficiently.

EXAMPLES

Now, the present invention will be described in further detail with reference to Examples. However, the present invention is not limited to the following Examples.

Among Ex. 1 to 10 given below, Ex. 2 to 4 are Examples of the present invention, and Ex. 1 and Ex. 5 to 10 are Comparative Examples.

Materials and measurement methods used in each Example are shown below.

(Materials)

PFA-1: TFE/perfluoro(alkyl vinyl ether) copolymer (crystalline melting point: 303° C., MFR: 15.2 g/10 min), manufactured by Asahi Glass Company Limited, product name: "Fluon PFA 73PT".

PFA-2: Obtained in Production Example 1 given below, TFE/NAH/PPVE copolymer (crystalline melting point: 296.4° C., MFR: 17.0 g/10 min).

(Measurement Methods)

<Composition of Fluororesin>

The composition of a fluororesin (molar ratio of respective structural units) was calculated from the data measured by an infrared absorption spectrum analysis, a melt NMR analysis, and a fluorine content analysis.

<Crystalline Melting Point (° C.)>

The crystalline melting point (Tm) of a fluororesin was determined by a differential scanning calorimetry (DSC). Specifically, using a thermal analyzer "EXSTAR DSC7020" (manufactured by Seiko Instruments Inc.), the melting peak at the time of raising the temperature at a rate of 10° C./minute, was recorded, and a temperature corresponding to the maximum value which is the top peak temperature (° C.) was taken as the crystalline melting point. The measurement of the crystalline melting point was conducted, respectively, with respect to the fluororesin prior to the electron beam irradiation and the fluororesin after the electron beam irradiation, and the result of the former is represented by Ta, and the result of the latter is represented by Tb.

<Melt Flow Rate (MFR) (g/10 min)>

Using the melt indexer manufactured by Techno Seven, under a load of 49N (5 kg) at 372° C., the mass (g) of the fluororesin flowing out in 10 minutes from a nozzle with a diameter of 2 mm and a length of 8 mm was measured, and the value was taken as MFR (g/10 min). The measurement of the melt flow rate was carried out, respectively, with respect to the fluororesin prior to the electron beam irradiation and the fluororesin after the electron beam irradiation, and the result of the former is represented by Ma, and the result of the latter is represented by Mb.

<Tensile Strength And Tensile Elongation (strength: Mpa, Elongation: %)>

From a fluororesin, in accordance with JIS K6251: 2010, test pieces of the No. 3 dumbbell (thickness: 1 mm) shape were prepared. With respect to five test pieces, a tensile strength/elongation test was conducted under conditions of a gauge length 20 mm and a tensile speed of 200 m/min, by means of "Strograph" manufactured by Toyo Seiki Seisakusho, Ltd., in a constant temperature/constant humidity environment controlled to be at a temperature of 23±2° C. under a humidity of 50%±10%, whereby the stress (MPa) at the time of the maximum load and the ratio (%) of the sample length at break relative to the initial sample length, were obtained. An average value of the obtained stress was calculated, and the average value was taken as the tensile strength. Further, an average value of the ratio thus obtained was calculated, and the average value was taken as the tensile elongation.

<Abrasion Resistance (Scrape Abrasion Resistance)>

An electric wire sample in each Ex. was cut in a length of 2 m, and using "Magnet wire abrasion tester (reciprocating)", product name, manufactured by Yasuda Seiki Seisakusho, Ltd., a scrape abrasion test was carried out by the test method in accordance with IS06722-1 to measure the abrasion resistance (number of times). Specifically, the test was conducted under conditions of needle diameter: 0.45±0.01 mm, needle material: SUS316 (JIS G7602-compliant), abrasion distance: 15.5±1 mm, abrasion rate: 55±5 times/min, load: 7N, and test environment: 23±1° C.

The abrasion resistance is represented by a number of reciprocation times of the needle required until the core wire is exposed from the insulating covering by the reciprocating motion of the needle. The more the abrasion resistance (number of times), the better the abrasion resistance of the wire covering material.

Production Example 1

Production of PFA-2

NAH (monomer of the structural unit (a1)), TFE (monomer of the structural unit (b1)) and PPVE (perfluoropropyl vinyl ether ($CF_2$=$CFO(CF_2)_3F$, monomer of the structural unit (b2)), were polymerized in the following manner to obtain a fluororesin (PFA-2).

Firstly, 369 kg of 1,3-dichloro-1,1,2,2,3-pentafluoropropane "AK225cb" (manufactured by Asahi Glass Company Limited) (hereinafter referred to also as "AK225cb") and 30 kg of PPVE (manufactured by Asahi Glass Company Limited) were preliminarily degassed and put in a polymerization vessel having an internal volume of 430L.

Inside of the polymerization vessel, the temperature was raised to 50° C., and the pressure was raised up to 0.89 MPa/G by feeding TFE into the polymerization vessel. As a polymerization initiator, a 0.36 mass % (perfluorobutyryl) peroxide/AK225cb solution was introduced at a rate of 6.25 mL per minute in a total amount of 3L into the polymerization vessel for polymerization. Here, "0.89 MPa/G" represents that the gauge pressure is 0.89 MPa. The same applies hereinafter.

During the polymerization, in order to maintain the inside of the polymerization vessel to 0.89 MPa/G, TFE (manufactured by Asahi Glass Company Limited) was fed into the polymerization vessel. At the same time, 0.1 mol % of NAH (manufactured by Hitachi Chemical Co., Ltd.) based on 100 mol % of TFE, was supplied into the polymerization vessel.

After 8 hours from the initiation of polymerization, at the time when 32 kg of TFE was charged, the polymerization vessel was cooled to room temperature, the pressure was lowered down to normal pressure, to obtain a slurry containing a fluororesin (PFA-2).

The obtained slurry was subjected to solid-liquid separation into the fluororesin (PFA-2) and AK225cb, and the recovered solid was dried at 150° C. for 15 hours to obtain 33 kg of a granular fluororesin (PFA-2).

The specific gravity of the fluororesin (PFA-2) was 2.15.

The copolymerization composition of the fluororesin (PFA-2) was (structural unit based on NAH): (structural unit based on TFE): (structural unit based on PPVE)=0.1:97.9:2.0 (molar ratio).

The crystalline melting point of the fluororesin (PFA-2) was 296.4° C.

MFR of the fluororesin (PFA-2) was 17.0 g/10 min at a measurement temperature of 372° C.

Ex. 1

The granular PFA-2 obtained in Production Example 1 was pelletized by biaxial extrusion of Φ 15 mm (manufactured by Technovel Corporation) under such a condition that a die mold temperature was 340° C., followed by the following extrusion molding of an electric wire to obtain an electric wire sample.

<Extrusion Molding of Electric Wire>

Using one having the following construction as an electrical wire production apparatus, an electric wire sample was prepared by extruding a molten fluororesin to cover on a core wire so that a thickness accuracy of the electric wire diameter would be ±0.03 mm. The molding was carried out under a molding temperature condition of 340° C.

Extruder: MS30-25 extruder, manufactured by IKG Corporation

Screw: Full flight, manufactured by IKG Corporation, L/D=24, Φ 30 mm.

Wire dice cross head: manufactured by Unitek, maximum conductor diameter: 3 mm, maximum die pore diameter: 20 mm.

Wire take-off machines, winder: manufactured by Hijiri Manufacturing, Ltd.

As the core wire, one manufactured by Yasuda Kogyo Co., Ltd. (twisted wire, core wire diameter: 1.8 mm, construction: 37/0.26 mm (1st layer: right twisted 7 lines, 2nd layer: left twisted 12 lines, 3rd layer: right twisted 18 lines)) was prepared.

With respect to the obtained wire sample, the scrape abrasion test was conducted by the above method, and the abrasion resistance (number of times) was measured. Separately, from the wire sample after EB irradiation, using a wire stripper, the wire covering (i.e. the layer of the fluororesin) was withdrawn from the core wire. After the withdrawing, using the obtained wire covering, the measurements of the MFR and the crystalline melting point were carried out. The results are shown in Table 1.

Ex. 2 to 6

To the wire sample obtained in Ex. 1, the electron beam (hereinafter referred to also as EB) was irradiated at an irradiation dose (kGy) shown in Table 1 in air (i.e. in the presence of oxygen).

With respect to the wire sample after EB irradiation, the scrape abrasion test was carried out by the above method, and the abrasion resistance (number of times) was measured. Separately, from the wire sample after EB irradiation, withdrawal of the wire covering from the core wire was carried out in the same manner as in Ex. 1, and using the obtained wire covering, measurements of MFR and crystalline melting point were conducted. The results are shown in Table 1.

Ex. 7

A wire sample was obtained by conducting electric wire extrusion molding in the same manner as Ex. 1 except for using PFA-1 in place of the pelletized PFA-2.

With respect to the obtained wire sample, the scrape abrasion test was carried out by the above method, and the abrasion resistance (number of times) was measured. Separately, from the wire sample after EB irradiation, withdrawal of the wire covering from the core wire was carried out in the same manner as in Ex. 1, and using the obtained wire covering, measurements of MFR and crystalline melting point were conducted. The results are shown in Table 1.

Ex. 8 to 10

To the wire sample obtained in Ex. 7, an electron beam (EB) was irradiated at an irradiation dose (kGy) shown in Table 1 in air (i.e. in the presence of oxygen).

With respect to the wire sample after EB irradiation, the scrape abrasion test was carried out by the above method, and the abrasion resistance (number of times) was measured. Separately, from the wire sample after EB irradiation, withdrawal of the wire covering from the core wire was carried out in the same manner as in Ex. 1, and using the obtained wire covering, measurements of MFR and crystalline melting point were conducted. The results are shown in Table 1

With respect to Ex. 2 to 6, and Ex. 8 to10, the values of Mb/Ma, Tb−Ta, and Wb/Wa are shown in Table 1. Mb/Ma, Tb−Ta, and Wb/Wa in Ex. 2-6 were determined respectively, by using the MFR, crystalline melting point, and tensile strength in Ex. 1 as Ma, Ta, and Wa. Mb/Ma, Tb−Ta, and Wb/Wa in Ex. 8 to 10 were determined, respectively, by using the MFR, crystal melting point, and tensile strength in Ex. 7 as Ma, Ta, and Wa.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Fluororesin |  |  | PFA-2 |  |  |  |  | PFA-1 |  |  |
| EB irradiation dose (kGy) | 0 | 1 | 5 | 20 | 50 | 100 | 0 | 5 | 50 | 150 |
| EB irradiation atmosphere | air | air | air | air | air | air | air | air | air | air |
| Crystalline melting point (° C.) | 296.4 | 298.3 | 299.3 | 299.8 | 302.9 | 306.1 | 309.6 | 310 | 312.0 | 313.0 |
| Tb—Ta | — | 1.9 | 2.9 | 3.4 | 6.5 | 9.7 | — | 0.4 | 2.4 | 3.4 |
| Tensile strength (MPa) | 34.0 | 35.0 | 30.9 | 25.3 | 21.2 | 16.4 | 32.7 | 30.1 | 14.5 | 79 |
| Wb/Wa | — | 1.03 | 0.91 | 0.74 | 0.62 | 0.48 | — | 0.92 | 0.44 | 0.24 |
| MFR (g/10 min) | 16.78 | 16.41 | 13.81 | 6.06 | 1.46 | 1.01 | 13.80 | 21.20 | 37.15 | 208.50 |
| Mb/Ma | — | 0.98 | 0.82 | 0.82 | 0.09 | 0.06 | — | 1.53 | 2.69 | 15.11 |
| Abrasion resistance (number of times) | 3370 | 16255 | 16896 | 6965 | 2750 | 2098 | 4992 | 3675 | 3125 | 874 |

From Table 1, in Ex. 2 to 4 wherein EB was irradiated to PFA-2 having a carbonyl group-containing group at an irradiation dose of less than 30 kGy, as compared to Ex. 1 wherein no EB was irradiated, the abrasion resistance was excellent, and the tensile strength was also sufficiently maintained.

On the other hand, the abrasion resistance in Ex. 5 to 6 wherein EB was irradiated to PFA-2 at an irradiation dose of at least 30 kGy, was lower than in Ex. 1. Further, as compared with Ex. 2 to 4, the displacement in the tensile strength was also large.

In Ex. 7 to 10 wherein PFA-1 having no carbonyl group-containing group was used, the abrasion resistance tended to decrease as the irradiation dose of EB increased, and improvement in abrasion resistance by EB irradiation, as observed in Ex. 2 to 4, was not observed. Further, in Ex. 7 to 10, unlike in Ex. 1 to 6, MFR was increased as the irradiation dose of EB increased. These results are considered to be attributable to that the main chain of PFA-1 was decomposed by EB irradiation.

INDUSTRIAL APPLICABILITY

The electric wire, molded article and resin material obtained by the production methods of the present invention, are excellent in mechanical properties such as abrasion resistance, tensile strength, tensile elongation, elastic modulus, etc., and such molded article and resin material are useful in wire covering applications or in a wide range of fields, for example, as a slide member to be used under a high load or at a high temperature.

This application is a continuation of PCT Application No. PCT/JP2015/055447 filed on Feb. 25, 2015, which is based upon and claims the benefit of priority from Japanese Patent Application No. 2014-035140 filed on Feb. 26, 2014. The contents of those applications are incorporated herein by reference in their entireties.

What is claimed is:

1. A method for producing an electric wire comprising a conductor and an insulating layer containing a fluororesin and covering a surface of the conductor, the method comprising:
    irradiating an electron beam to the insulating layer to modify at least part of the fluororesin, thereby forming an insulating layer containing a modified fluororesin,
    wherein
    the fluororesin
        has a crystalline melting point prior to the electron beam irradiation Ta of at least 260° C.,
        contains either one or both of a structural unit (a) having a carbonyl group-containing group and a main chain terminal group (a') having a carbonyl group-containing group, and a structural unit (b) based on a perfluoromonomer which does not contain the structural unit (a), and
        does not contain a structural unit based on a hydrocarbon monomer except for the structural unit (a); and
    said irradiating is conducted at an irradiation dose of less than 30 kGy at a temperature of less than Ta in air.

2. The method according to claim 1, wherein
    the fluororesin is a copolymer comprising a structural unit (a1) based on a hydrocarbon monomer having either one or both of a carboxyl group and an acid anhydride group, a structural unit (b1) based on tetrafluoroethylene, and a structural unit (b2) based on a perfluoromonomer which is not tetrafluoroethylene, and
    based on a total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %.

3. A method for producing a molded article, the method comprising:
    irradiating an electron beam to a molded article containing a fluororesin, to modify at least part of the fluororesin, thereby obtaining a molded article containing a modified fluororesin,
    wherein
    the fluororesin
        has a crystalline melting point prior to the electron beam irradiation Ta of at least 260° C.,
        contains either one or both of a structural unit (a) having a carbonyl group-containing group and a main chain terminal group (a') having a carbonyl group-containing group, and a structural unit (b) based on a perfluorotnonomer which does not contain the structural unit (a), and
        does not contain a structural unit based on a hydrocarbon monomer except for the structural unit (a); and
    said irradiating is conducted at an irradiation dose of less than 30 kGy at a temperature of less than Ta in air.

4. The method according to claim 3, wherein
    the fluororesin is a copolymer comprising a structural unit (a1) based on a hydrocarbon monomer having either one or both of a carboxyl group and an acid anhydride group, a structural unit (b1) based on tetrafluoroethylene, and a structural (b2) based on a perfluoromonomer which is not tetrafluoroethylene, and
    based on a total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %.

5. A method for producing a resin material containing a modified fluororesin, the method comprising:
    irradiating an electron beam to a resin material containing a fluororesin, to modify at least part of the fluororesin, thereby obtaining the resin material containing the modified fluororesin,
    wherein
    the fluororesin
        has a crystalline melting point prior to the electron beam irradiation Ta of at least 260° C.,
        contains either one or both of a structural unit (a) having a carbonyl group-containing group and a main chain terminal group (a') having a carbonyl group-containing group, and a structural unit (h) based on a perfluoromononier which does not contain the structural unit (a), and
        does not contain a structural unit based on a hydrocarbon monomer except for the structural unit (a); and
    said irradiating is conducted at an irradiation dose of less than 30 kGy at a temperature of less than Ta in air.

6. The method according to claim 5, wherein
    the fluororesin is a copolymer comprising a structural unit (a1) based on a hydrocarbon monomer having either one or both of a carboxyl group and an acid anhydride group, a structural unit (b1) based on tetrafluoroethylene, and a structural unit (b2) based on a perfluoromonomer which is not tetrafluoroethylene, and
    based on a total molar amount of the structural unit (a1), the structural unit (b1) and the structural unit (b2), the structural unit (a1) is from 0.01 to 5 mol %, the structural unit (b1) is from 50 to 99.89 mol %, and the structural unit (b2) is from 0.1 to 49.99 mol %.

7. A process for producing a molded article, the method comprising:
    molding a resin material containing a modified fluororesin obtained by the method according to claim 6, thereby obtaining the molded article.

8. The method according to claim 1, wherein said irradiating satisfies $0.5 \leq Mb/Ma < 1.2$, where Ma represents a melt flow rate by g10 min of the fluororesin prior to the electron beam irradiation, and Mb represents a melt flow rate by g/10 min of the modified fluororesin after the electron beam irradiation.

9. The method according to claim 1, wherein said irradiating satisfies 1≤Tb−Ta<6.5, where Tb is a crystalline melting point by ° C. of the modified fluororesin after the electron beam irradiation.

10. The method according to claim 1, wherein said irradiating satisfies 0.5≤Mb/Ma<1.2, where Ma represents a melt flow rate by g/10 min of the fluororesin prior to the electron beam irradiation, and Mb represents a melt flow rate by g/10 min of the modified fluororesin after the electron beam irradiation; and 1≤Tb−Ta<6.5, where Tb is a crystalline melting point by ° C. of the modified fluororesin after the electron beam irradiation.

11. The method according to claim 1, wherein said irradiating is conducted at a temperature of at most (Ta−5)° C.

12. The method according to claim 3, wherein said irradiating satisfies 0.5≤Mb/Ma<1.2, where Ma represents a melt flow rate by g/10 min of the fluororesin prior to the electron beam irradiation, and Mb represents a melt flow rate by g/10 min of the modified fluororesin after the electron beam irradiation.

13. The method according to claim 3, wherein said irradiating satisfies 1≤Tb−Ta<6.5 where Tb is a crystalline melting point by ° C. of the modified fluororesin after the electron beam irradiation.

14. The method according to claim 3, wherein said irradiating satisfies 0.5≤Mb/Ma<1.2, where Ma represents a melt flow rate by g/10 min of the fluororesin prior to the electron beam irradiation, and Mb represents a melt flow rate by g/10 min of the modified fluororesin after the electron beam irradiation; and 1≤Tb−Ta<6.5, where Tb is a crystalline melting point by ° C. of the modified fluororesin after the electron beam irradiation.

15. The method according to claim 3, wherein said irradiating is conducted at a temperature of at most (Ta−5)° C.

16. The method according to claim 5, wherein said irradiating satisfies 0.5≤Mb/Ma<1.2, where Ma represents a melt flow rate by g/10 min of the fluororesin prior to the electron beam irradiation, and Mb represents a melt flow rate by g/10 min of the modified fluororesin after the electron beam irradiation.

17. The method according to claim 5, wherein said irradiating satisfies 1≤Tb−Ta<6.5, where Tb is a crystalline melting point by ° C. of the modified fluororesin after the electron beam irradiation.

18. The method according to claim 5, wherein said irradiating satisfies 0.5≤Mb/Ma<1.2, where Ma represents a melt flow rate by g/10 min of the fluororesin prior to the electron beam irradiation, and Mb represents a melt flow rate by g/10 min of the modified fluororesin after the electron beam irradiation; and 1≤Tb−Ta<6.5, where Tb is a crystalline melting point by ° C. of the modified fluororesin after the electron beam irradiation.

19. The method according to claim 5, wherein said irradiating is conducted at a temperature of at most (Ta−5)° C.

* * * * *